(12) United States Patent
Kato

(10) Patent No.: US 11,670,255 B2
(45) Date of Patent: Jun. 6, 2023

(54) SIGNAL LIGHT DISPLAY DETERMINATION DEVICE, SIGNAL LIGHT DISPLAY DETERMINATION METHOD, AND NON-TRANSITORY COMPUTER-READABLE RECORDING MEDIUM

(71) Applicant: CASIO COMPUTER CO., LTD., Tokyo (JP)

(72) Inventor: Yoshiyuki Kato, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 533 days.

(21) Appl. No.: 16/828,745

(22) Filed: Mar. 24, 2020

(65) Prior Publication Data

US 2020/0311427 A1 Oct. 1, 2020

(30) Foreign Application Priority Data

Mar. 25, 2019 (JP) .............................. JP2019-056104

(51) Int. Cl.
| | |
|---|---|
| G06K 9/00 | (2022.01) |
| G09G 5/00 | (2006.01) |
| H04N 7/18 | (2006.01) |
| G06T 1/00 | (2006.01) |
| G06V 20/20 | (2022.01) |
| G06V 10/56 | (2022.01) |
| G06V 10/30 | (2022.01) |

(52) U.S. Cl.
CPC ........... *G09G 5/003* (2013.01); *G06T 1/0014* (2013.01); *G06V 10/30* (2022.01); *G06V 10/56* (2022.01); *G06V 20/20* (2022.01); *H04N 7/183* (2013.01)

(58) Field of Classification Search
None
See application file for complete search history.

(56) References Cited

U.S. PATENT DOCUMENTS

2016/0191158 A1* 6/2016 Aoyama ................ H04B 10/54
398/172

FOREIGN PATENT DOCUMENTS

| JP | H11-134591 A | 5/1999 | |
|---|---|---|---|
| JP | 2000-353292 A | 12/2000 | |
| JP | 2002-358111 A | 12/2002 | |
| JP | 2007124676 A * | 5/2007 | ......... G06K 9/00798 |

(Continued)

*Primary Examiner* — Wei Wen Yang
(74) *Attorney, Agent, or Firm* — Fitch, Even, Tabin & Flannery LLP

(57) ABSTRACT

A signal light display determination device includes a memory to store a program; and a processor to execute the program, wherein the processor executes the program to
acquire image information regarding a first region and a second region that is in close proximity to the first region, the first region and the second region being within a region containing at least a portion of a display of a signal light that is image-captured by a camera,
determine, based on the acquired image information regarding the second region, a display state of the display included in the second region, and
correct the acquired image information regarding the first region when a determination is made that the display state of the display included the second region has not continued in a state below a threshold for a predetermined time period, the correction being made based on the acquired image information regarding second region.

18 Claims, 9 Drawing Sheets

(56) References Cited

FOREIGN PATENT DOCUMENTS

JP WO2011074087 A1 6/2011
JP 2015-097018 A 5/2015

\* cited by examiner

SIGNAL LIGHT DISPLAY DETERMINATION DEVICE, SIGNAL LIGHT DISPLAY DETERMINATION METHOD, AND NON-TRANSITORY COMPUTER-READABLE RECORDING MEDIUM

CROSS-REFERENCE TO RELATED APPLICATION

This application claims the benefit of Japanese Patent Application No. 2019-056104, filed on Mar. 25, 2019, the entire disclosure of which is incorporated by reference herein.

FIELD

This application relates to a signal light display determination device, a signal light display determination method and a non-transitory computer-readable recording medium.

BACKGROUND

A signal light is used for indicating an operation status of a device by a display state. A device manager confirms the operation status of a device by visually confirming the display of the signal light. Techniques such as that described in Unexamined Japanese Patent Application Kokai Publication No. 2000-353292 exist for reducing the burden on a device manager.

A device described in Unexamined Japanese Patent Application Kokai Publication No. 2000-353292 compares an image of a signal light captured by a camera against an average luminance of the lit state and an average luminance of an unlit state and determines the display state of the signal light.

SUMMARY

In order to achieve the aforementioned objective, a signal light display determination device of the present disclosure includes:
a memory to store a program; and
a processor to execute the program,
wherein
the processor that executes the program to
acquire image information regarding a first region and a second region that is in close proximity to the first region, the first region and the second region being within a region containing at least a portion of a display of a signal light that is image-captured by a camera,
determine, based on the acquired image information regarding the second region, a display state of the display included in the second region, and
correct the acquired image information regarding the first region when a determination is made that the display state of the display included the second region has not continued in a state below a threshold for a time period, the correction being made based on the acquired image information regarding second region.

BRIEF DESCRIPTION OF THE DRAWINGS

A more complete understanding of this application can be obtained when the following detailed description is considered in conjunction with the following drawings, in which.

DETAILED DESCRIPTION

A production facility management system including a signal light display determination device according to an embodiment of the present disclosure is described below in detail with reference to the drawings.

Configuration of Production Facility Management System

Figure 1:
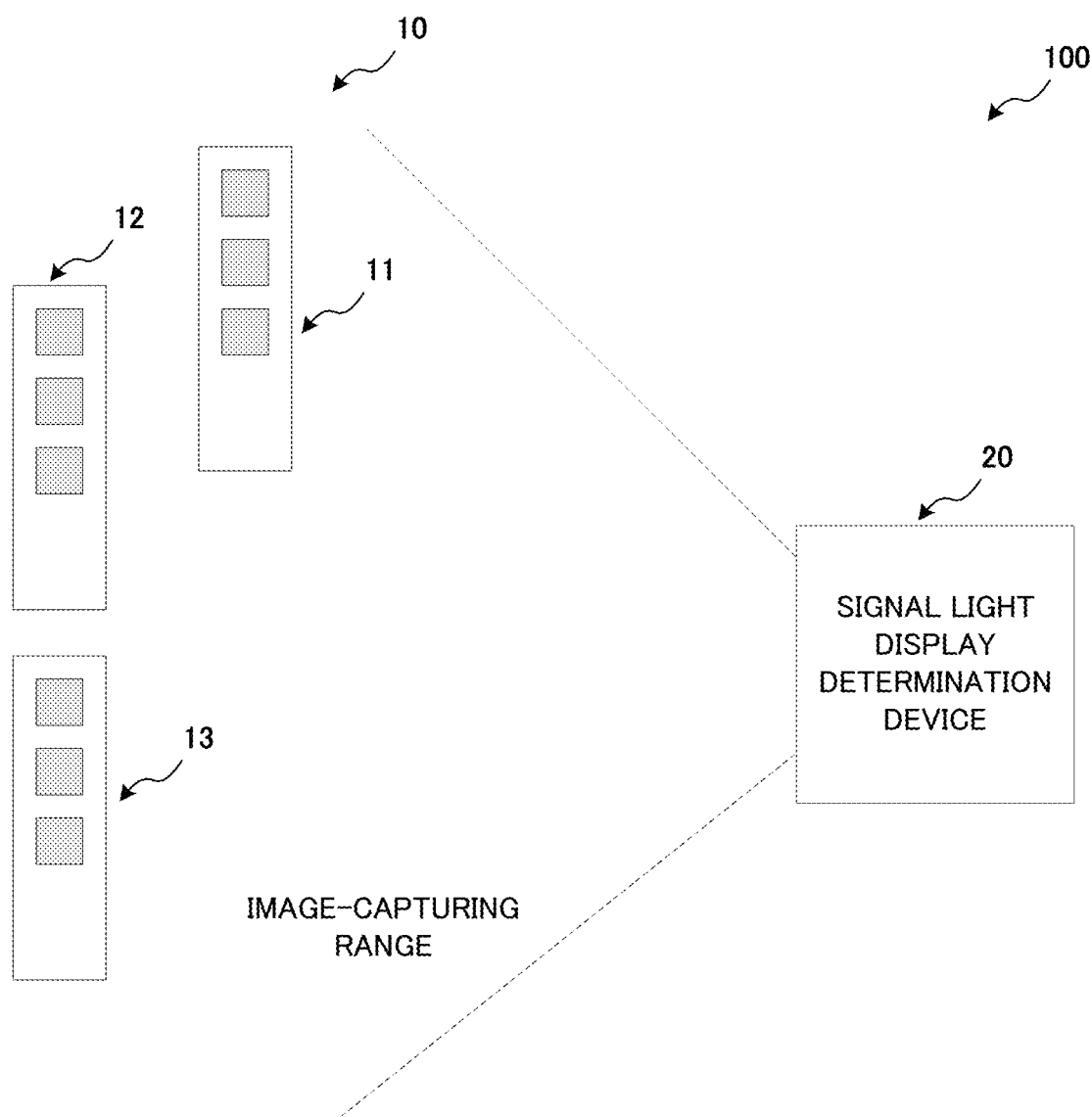
FIG. 1 is a configuration diagram of a production facility management system according to an embodiment of the present disclosure.

A illustrated in FIG. 1, a production facility management system 100 includes a stacked-type signal light group 10 (signal lights 11, 12, and 13) that is installed in, for example, a production facility of a factory and a signal light display determination device 20 that image-captures display states of the signal lights 11, 12, and 13. A production facility manager of a factory grasps the operation status of the production facility of the factory by monitoring the signal light display determination device 20 of the production facility management system 100.

Configuration of Signal Light

Figure 2:
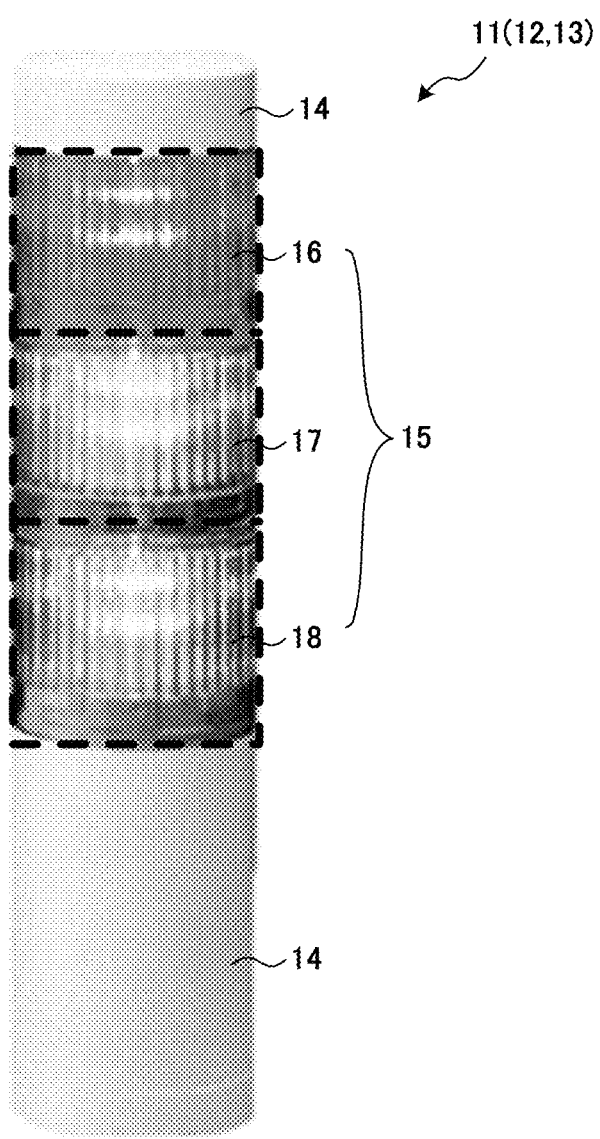
FIG. 2 is a diagram illustrating an overview of a signal light according to the embodiment of the present disclosure.

As illustrated in FIG. 2, the signal lights 11, 12, and 13 are stacked-type signal lights and are used for indicating an operation state of a non-illustrated conveyer in a production facility. The signal lights 11, 12, and 13 each include a base 14, a display 15, a non-illustrated sensor that detects an operation state of a conveyer of the production facility, and a non-illustrated controller that controls components such as the display 15 and the sensor.

The base 14 supports the display 15. The base 14 is, for example, a acrylonitrile butadiene styrene (ABS) resin-type opaque tubular body and the bottom portion of the base 14 is fixed to a floor, a wall surface, a conveyor, or the like. In the present embodiment, the display 15 is equipped with three lamps. The three lamps are lamps (lamp portions) 16, 17, and 18. The lamps 16, 17, and 18 each have an acrylic resin-type transparent tubular body and light emitting diodes (LED) that are disposed inside the tubular body. The LEDs of the lamp 16 light up red, the LEDs of the lamp 17 light up yellow, and the LEDs of the lamp 18 light up green. The lamp 16 lights up when production line is stopped due to an abnormality. The lamp 17 lights up when the conveyor of the production facility is below a predetermined speed. The lamp 18 lights up when the conveyor of the production is equal to or greater than the predetermined speed. While the production facility is not in operation because the workers are taking a break or the production facility under maintenance, none of the lamps 16, 17, and 18 are lit. More than one lamp of the lamps 16, 17, and 18 might light up in a case where the signal lights 11, 12 and 13 are malfunctioning, for example. Each of the signal lights 11, 12, and 13 is installed at a different conveyor.

Configuration of the Signal Light Display Determination Device

Figure 3:
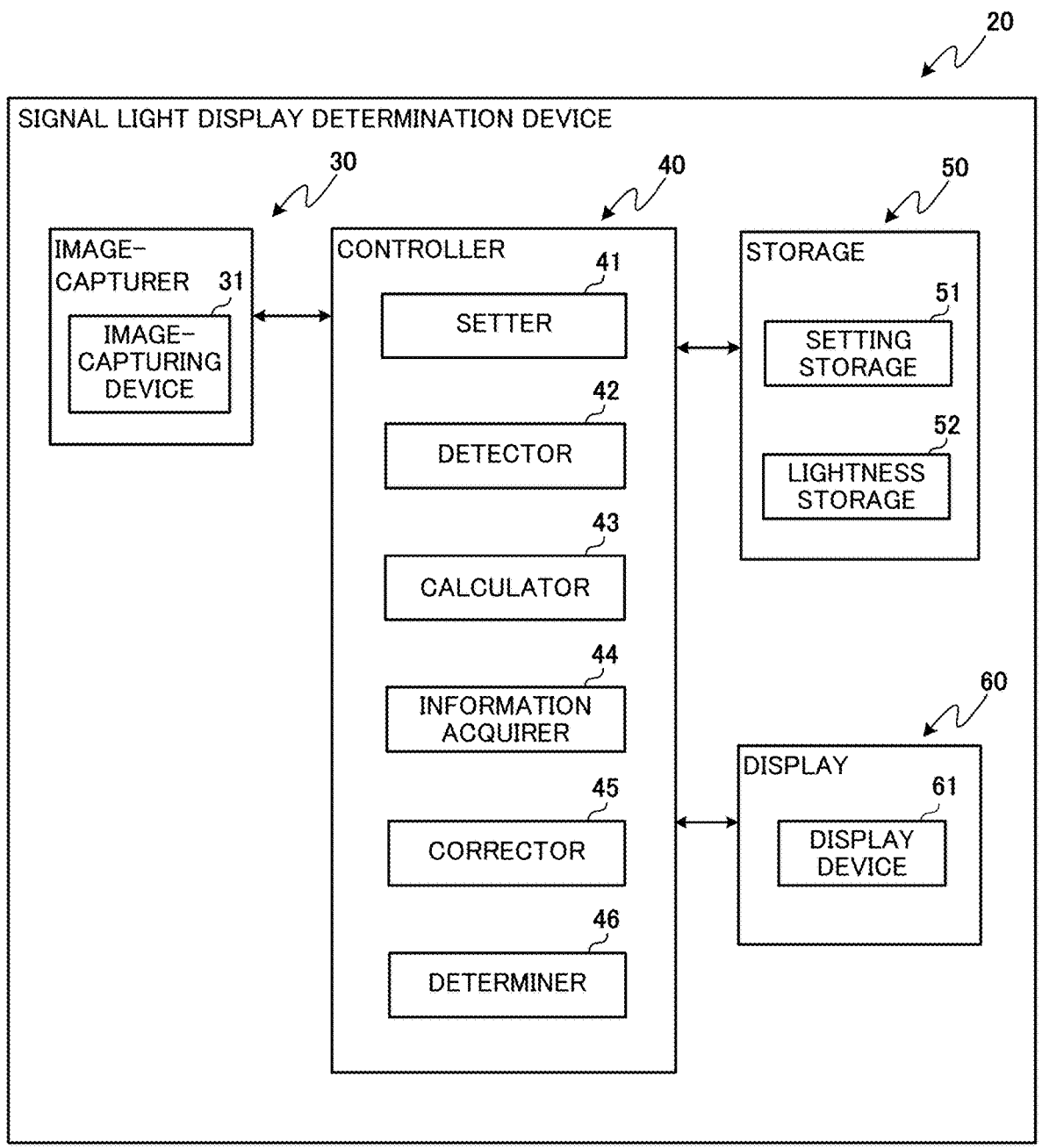
FIG. 3 is a block diagram of a signal light display determination device according to the embodiment of the present disclosure.

The signal light display determination device 20 determines whether the lamps 16, 17, or 18 for each of the signals lamps 11, 12, and 13 are lit or unlit and presents the determination results to a user. The signal light display determination device 20, as illustrated in FIG. 3, includes an image-capturer 30, a controller 40, and a display 60. The signal light display determination device 20 is placed in a position enabling the image-capturer 30 to capture the signal lights 11, 12, and 13 at the same time.

The image-capturer 30 captures the signal lights 11, 12, and 13. The image-capturer 30 is equipped with a single image-capturing device 30(camera). In the present embodiment, the image-capturing device 31 has the same functions as those of a typical digital camera. The image-capturing device 31 is placed in location such that the distance between the image-capturing device 31 and the signal lights 11, 12, and 13 is no less than five meters. In the present embodiment, the image-capturing device 31 of the image-capturer 30 captures the signal lights 11, 12, and 13 at 30 frames per second (fps) with a 100 degree angle of view while operation of the production facility is underway. The image-capturer 30 transmits the captured images to the controller 40.

The controller 40 detects the signal lights 11, 12, and 13 from the images transmitted by the image-capturer 30, corrects the effects of natural sunlight or the adjacent lamps, calculates the lightness of each lamp 16, 17, and 18 and the rate of change of each brightness, and determines the display state of the display 15 of each signal light 11, 12, and 13. The controller 40 includes a central processing unit (CPU) and other components and executes programs stored in the storage 50 to achieve the functions of the individual components (a setter 41, a detector 42, a calculator 43, an information acquirer 44, a corrector 45, and a determiner 46), which are described further below. The controller 40 also includes a non-illustrated time clock and thus can acquire the current time and date and count the time elapsed.

The storage 50 includes a read-only memory (ROM), a random access memory (RAM), and the like and also includes a setting storage 51 and a lightness storage 52. Programs (for example, a program used for signal light display determination processing to calculate the lightness of the display 15 which is described further below) to be executed by the CPU of the controller 40 and data necessary for executing the programs are stored in advance in the ROM. Data that is created or modified during execution of the programs are stored in the RAM.

Position information, various initial settings, and the like of the signal lights 11, 12, and 13 to be set by the setter 41, which is described further below, are to be stored in the setting storage 51.

The lightness V of each frame of the lamps 16, 17, and 18 of each signal light 11, 12, and 13 calculated by the controller 40, which is described further below, is stored in the lightness storage 52. The hue, pattern or the like of each frame of the lamps 16, 17, and 18 of each signal light 11, 12, and 13 may be stored.

The display 60 displays the display status of the lamps 16, 17, and 18 of the signal lights 11, 12, and 13 transmitted from the controller 40. The display 60 is equipped with a display device 61 that includes a liquid crystal display (LCD) panel.

The display device 61 utilizes thin-film transistor (TFT) technology, liquid crystal technology, electroluminescent (EL) technology, or the like.

Next, the functional configuration of the controller 40 of the signal light display determination device 20 is described. The controller 40 achieves the functions of the setter 41, the detector 42, the calculator 43, the information acquirer 44, the corrector 45, and the determiner 46, calculates, based on the captured images, the lightness V and the rate of change of the lightness of each frame of the lamps 16, 17, and 18 of each of the signal lights 11, 12, and 13 based on the captured images, and determines the display state of each display 15.

The setter 41 sets the position information of the display 15 of each signal light 11, 12, and 13. The position information contains positions and sizes of regions of the set display 15 within the captured image, the angle of view and the zoom magnification of the image-capturing device 31. The setting of the regions of the display 15 within the captured image is performed by obtaining, at the time of installation of the image-capturing device 31, the difference between still image taken when all of the signal lights 11, 12, and 13 are lit and still image taken when all of the signal lights 11, 12, and 13 are unlit. The setter 41, as illustrated by the dashed-lines in FIG. 2, divides region of the set display 15 into three portions and, sets the top portion as the region of the lamp 16, the middle portion as the region of the lamp 17, and the bottom portion as the region of the lamp 18. This is described in detail further below. The angle of view and the zoom magnification is automatically acquired from the image-capturing device 31 by the setter 41.

Figure 4:
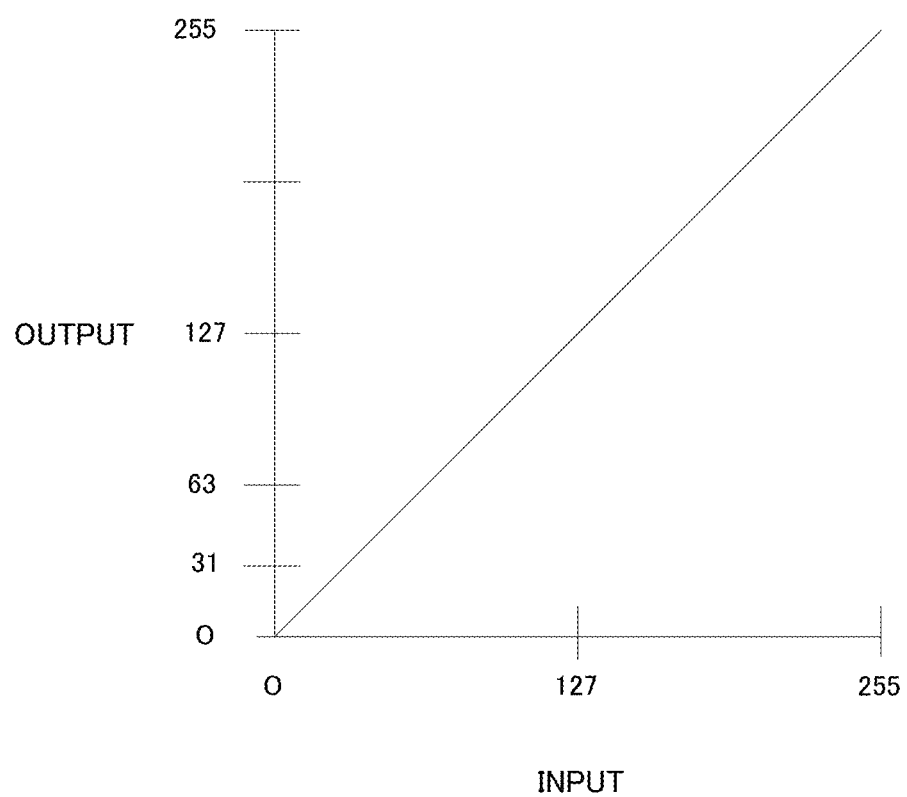
FIG. 4 is a graph illustrating gamma correction according to the embodiment of the present disclosure.

Referring back to FIG. 3, the detector 42 detects, based image received from the image-capturer 30, pixel values P of the regions of the display 15 within the image which were set by the setter 41, and transmits the pixel values P to the calculator 43. The gamma correction performed when importing images is processed in the linear setting as illustrated in FIG. 4.

Referring back to FIG. 3, the calculator 43 converts detected pixel values P from a YUV color space of 8-bit inputs expressed by a combination of luminance signal (Y) and color differences (U and V which are a luminance signal and a red component difference and the luminance signal and a blue component difference respectively) to a hue-saturation-value (HSV) color space. The detector 43 transmits the lightness obtained by performing the calculations based on the image and transmits the obtained lightness to the information acquirer 44.

Figure 5:
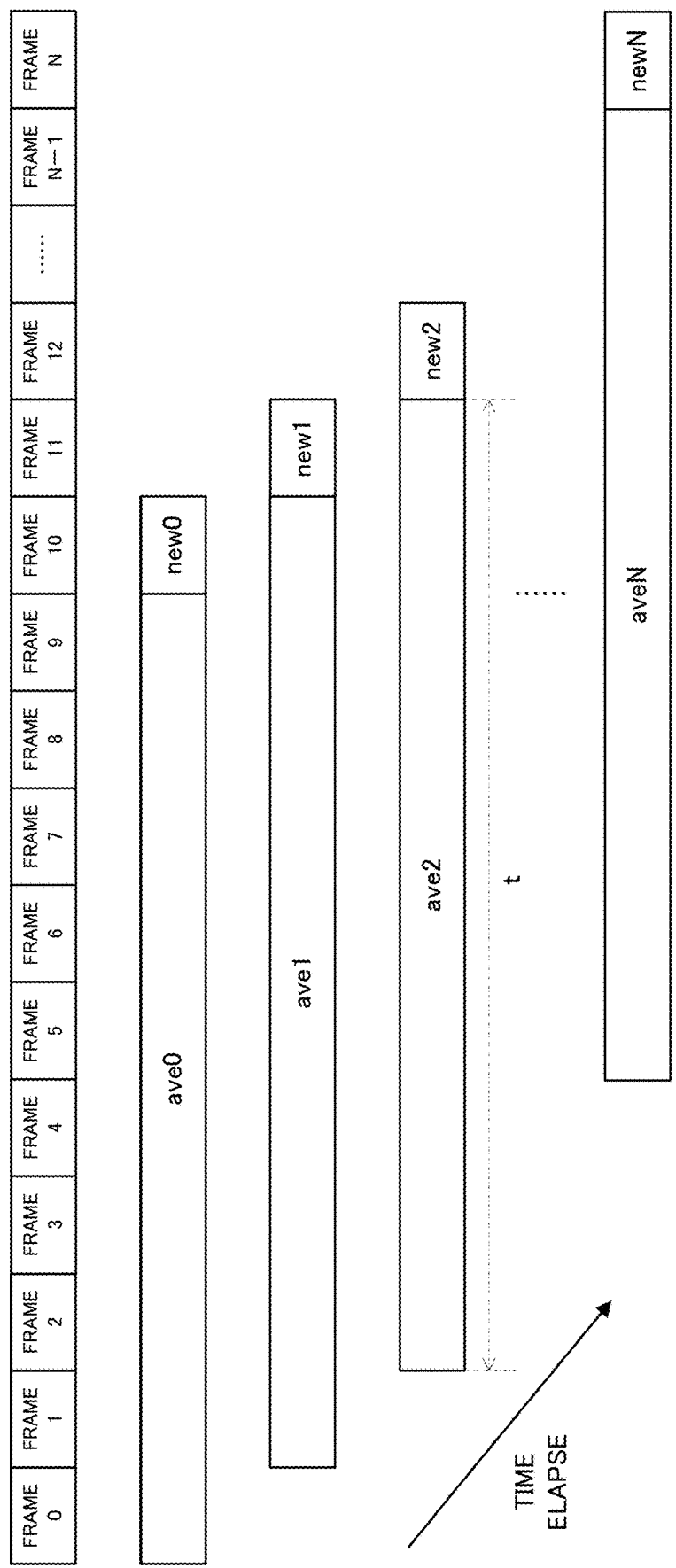
FIG. 5 is a diagram illustrating a configuration of lightness that is calculated by the signal light display determination device according to the embodiment of the present disclosure.

The information acquirer 44 normalizes the acquired lightness to a percentage where 0 is the minimum value and 100 is the maximum value and then calculates the lightness V in the frame. Each time another frame is acquired, the information acquirer 44 calculates the average value Vh of the lightness V within the regions of lamps 16, 17, and 18 of each signal light 11, 12, and 13 and stores the average values Vh in the lightness storage 52. Specifically, as illustrated in FIG. 5, these calculated average values Vh are stored in the Frame 0, Frame 1, Frame 2, . . . , and Frame N of the lightness storage 52, as $Vh_1$, $Vh_2$, . . . $Vh_N$. Each time a new frame is acquired, the information acquirer 44, uses the lightness Vh to calculate a movement average value ave0, ave1, ave2, . . . , aveN of the lightness of the lamps 16, 17, and 18 of each signal light 11, 12, and 13 in a predetermined time period t, being ten frames in the present embodiment, and transmits the calculated movement average value to the corrector 45. In the present embodiment, the frame rate is 30 fps so by using the movement average of ten frames which is the common divisor of a commercial power supply frequency of 50 Hz or 60 Hz, the effect of imaging-element noise present when a fluorescent light flickers or lightness is low can be reduced.

Referring back to FIG. 3, the corrector 45 corrects, based on the lightness $Vh_{N2}$ in the current image (Frame N) of the adjacent lamp and the average value aveN2 of the predetermined time period t being the ten frames immediately before the current of the current image in the present embodiment, the lightness $Vh_{N1}$ in the current image of the lamp to determined and the lightness aveN1 of the movement average values of the images of the predetermined time period t. The correcting is described in detail further below. Regarding the lamp that is to be determined, the corrector 45 calculates the rateN of change of the lightness of the lamp that is to be determined by dividing the corrected lightness $Vh_{N1}$ by the lightness aveN1 and then multiplying the quotient by 100.

If the rateN transmitted from the corrector 45 is greater than or equal to a predetermined threshold, for example, greater than or equal to 125 in the present embodiment, then the determiner 46 makes a determination that the display state of the particular lamp has changed to the lit state. Also, if the rateN is below a predetermined threshold, for example, below 80 in the present embodiment, then the determiner 46 makes a determination that the display state of that particular lamp has changed to the unlit state. The determiner 46 transmits the determination result of the display state of the lamp to the display 60.

Figure 6:
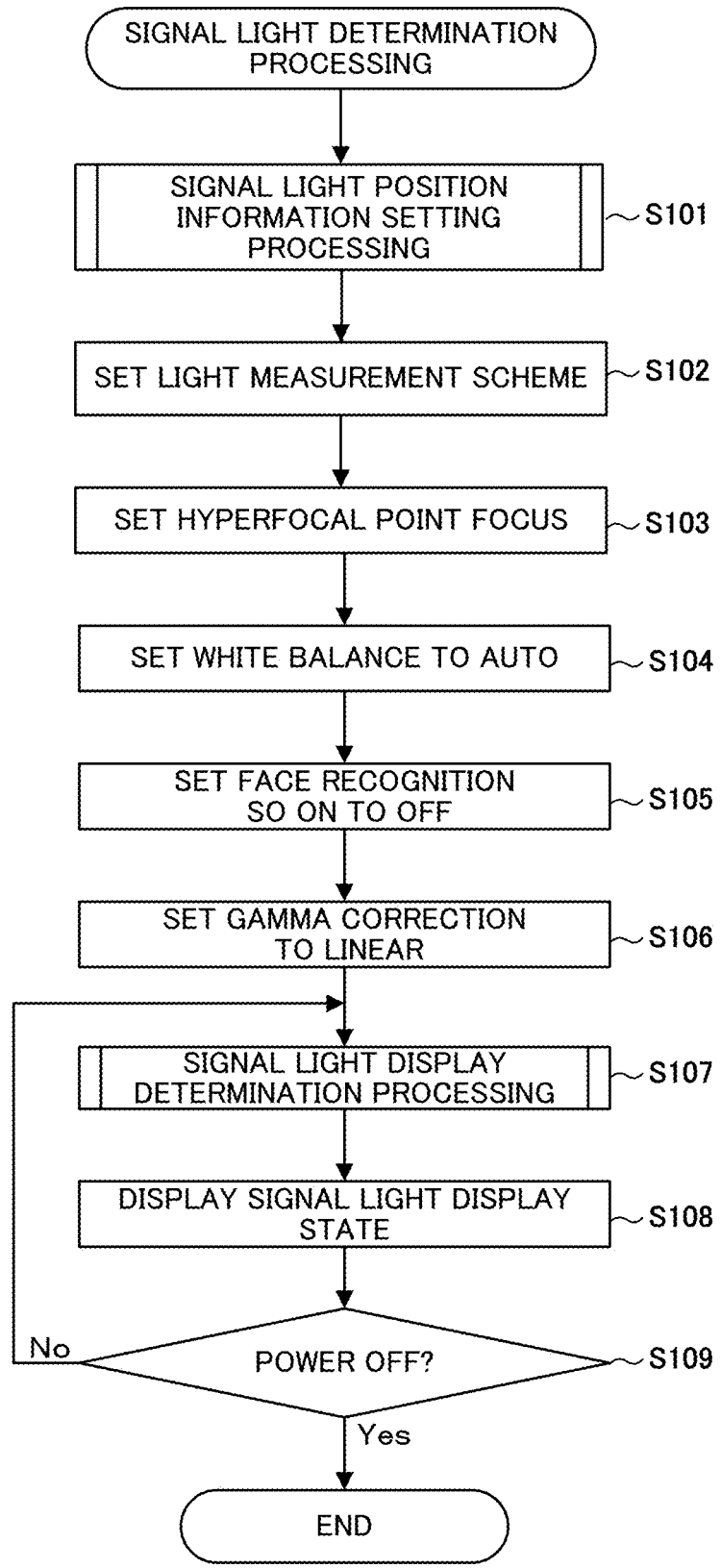
FIG. 6 is a flowchart of determination processing of a signal light of the signal light display determination device according to the embodiment of the present disclosure.

The functions and configuration of the production facility management system 100 are described above. Next, the determination processing of the signal light of the signal light display determination device 20 of the production facility management system 100 is described with reference to FIG. 6.

First, the various settings of the signal light display determination device 20 are initialized when the signal light display determination device 20 is powered on. The signal lights 11, 12, and 13 are also powered on. The setter 41 performs signal light position information setting processing for performing the initial setting of the signal light display determination device 20 (step S101). This is described in detail further below.

Next, the light measurement method is set. The setter 41 selects average metering as the light measurement scheme (step S102) and then sets the focus setting of the lens of the image-capturing device 31 to hyperfocal point (step S103). By maintaining a distance of greater than or equal to 5 m between the image-capturing device 31 and the signal lights 11, 12, and 13, objects beyond the hyperfocal point are brought into focus, and thus it is unnecessary to change the focus position while the signal light display determination device is in operation. Consequently, the angle of view does likewise does not change.

The setter 41 sets the white balance to automatic (step S104) and sets the function of face recognition and the like to off (step S105). Gamma correction (gradation correction) is set to linear (step S106). In a typical camera, although it is typical for the curve to be 1.8 or 2.2 due to the relationship between, for example, display devices and prints, the linear setting is used in order to grasp the changes in the lamps 16, 17, and 18 of each of the signal lights 11, 12, and 13 as is. The setter 41 stores the aforementioned various settings into the setting storage 51 and in a case where no change is made to the settings of the signal light group 10 and the signal light display determination device 20, the setter 41 uses the settings in the setting storage 51 thereby obviating need for resetting during startup.

Next, the signal light display determination processing is performed. The determiner 46 makes a determination as to whether or not the lamps 16, 17, and 18 of the respective signal lights 11, 12, and 13 became lit or unlit and transmits the determination results to the controller 40 (step S107). The details of the signal light display determination processing are described further below.

The controller 40 displays the results of the signal light display determination processing on the display 60 (step S108). By viewing the display 60, the production facility manager can confirm the display state of the signal lights 11, 12, and 13 without having to directly observe the signal lights 11, 12, and 13.

Processing ends when the signal light display determination device 20 is powered off (YES in step S109).

If the signal light display determination device 20 is not powered off (NO in step S109), then processing returns to step S107.

Figure 7:
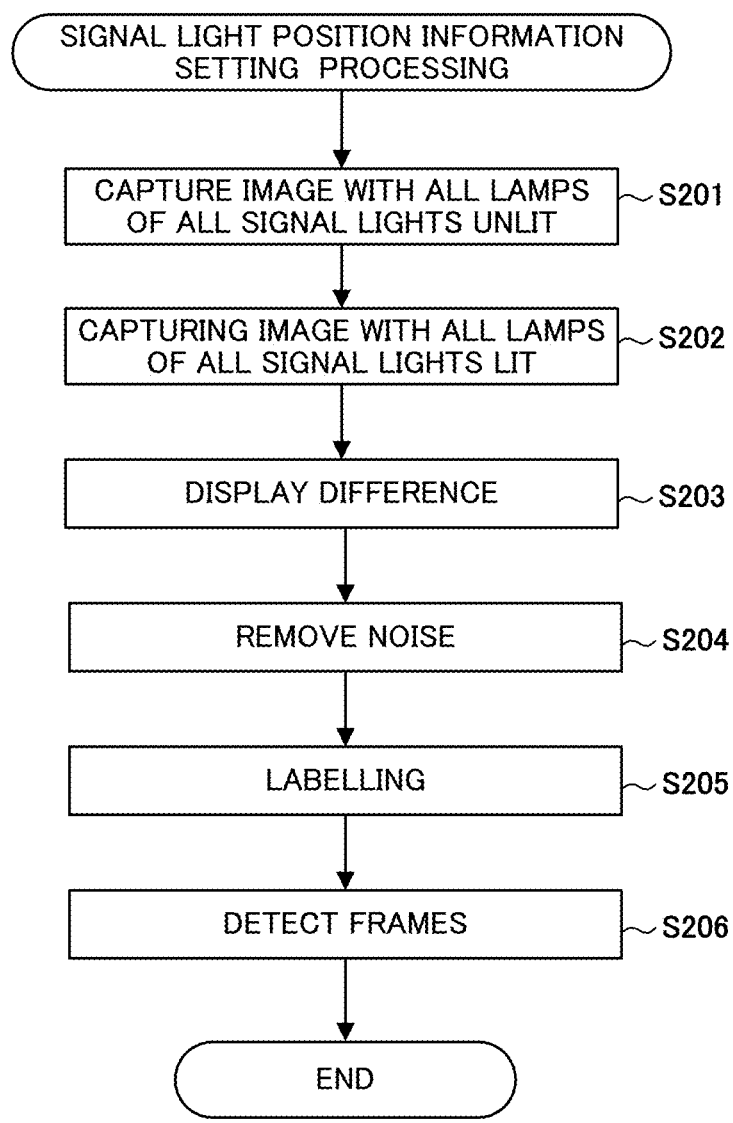
FIG. 7 is a flowchart of signal light position information setting processing of the signal light display determination device according to the embodiment of the present disclosure.

The determination processing of the signal lights of the signal light display determination device 20 is described above. Next, the signal light position information setting processing is described with reference to FIG. 7.

First, the setter 41 captures an image P with the lamps 16, 17, and 18 of all of the signal lights 11, 12, and 13 in the unlit state and saves the image P in the setting storage 51 (step S201).

Next, the setter 41 captures an image L with the lamps 16, 17, and 18 of all of the signal lights 11, 12, and 13 in the lit state and saves the image L in the setting storage 51 (step S202).

The setter 41 obtains the difference D between the image P and the image L, performs image binarization processing thereby obtaining image G, and displays image G on the display 60 (step S203).

When capturing the image P and the image L, a case may arise where, for example, a person or object passing by is displayed as noise in the difference D. Therefore, the setter 41 performs filter processing on the image G and removes noise from the difference D (step S204).

The setter 41 labels each region in the noise-removed image G. In the present embodiment, the regions of the display 15 for each of the signal lights 11, 12, and 13 are assigned numbers. In doing so, the setter 41 determines how many units of signal lights there are (step S205).

The setter 41 detects the frames (borders of the regions of the display 15 for the signal lights 11, 12, and 13) based on the label information. In doing so, the setter 41 sets the position of the display 15 for each signal light 11, 12, and 13 and stores the positions in the setting storage 51. In the present embodiment, since the display 15 includes three lamps, the setter 41 divides the region of the display 15 into three portions and, sets the top portion as the region of the lamp 16, the middle portion as the region of the lamp 17, and the bottom portion as the region of the lamp 18. The setter 41 also uses the image L and the image P to set the angle of view of the image-capturing device 31 and stores this information into the setting storage 51. The setter 41 sets the frame rate, and in the present embodiment, sets frame rate to 30 fps, and stores the frame rate into the setting storage 51. Processing ends upon doing so (step S206).

The signal light position information setting processing of the signal light display determination device 20 is described above. Next the signal light display determination processing is described with reference to FIG. 8. As one example, a case is described where a determination is made as to whether or not there was a change in the display state of the lamp 16 of the signal light 11 at a point in time when an image serving as a basis for Frame N is captured by the image-capturer 30. For the sake of simplicity, it is taken that the lamps 16, 17, and 18 neither light up nor become unlit during a predetermined time period t (ten frames), which is described further below.

First, the image-capturer 30 causes the image-capturing device 31 to capture an image of the signal light group 10 (signal lights 11, 12, and 13). The image-capturer 30 transmits the captured image to the detector 42 (step S301).

Regarding signal light 11, the detector 42 detects, from the captured image, pixels P of the lamp 16 and the lamp 17 specified by the setter 41 and then transmits the detected pixels P to the calculator 43 (step S302).

The calculator 43 converts the detected pixels P from YUV-based color space information into HSV-based color space information. The detector 43 transmits the lightness of the lamp 16 and the lamp 17 obtained by performing the calculation based on the image to the information acquirer 44 (step S303).

The information acquirer 44 performs normalization and uses the acquired lightness to calculate the lightness Vt1 and Vt2 in the frames for the lamp 16 and the lamp 17 of the display 15 of the signal light 11 using Equation (1) below where m=0 and M=100 (minimum value 0 and maximum value 100 (percent) (step S304).

$$Y = \frac{X - x_{min}}{x_{max} - x_{min}}(M - m) + m \quad (1)$$

The information acquirer 44 calculates the average values Vh1 and Vh2 of the lightness Vt1 and Vt2 within regions of the lamps 16 and 17 of the signal light 11 for each frame and individually stores these, as illustrated in FIG. 5, in Frame 0, Frame 1, Frame 2, . . . of the lightness storage 52 as $Vh1_1$, $Vh1_2$, . . . $Vh1_{N-1}$, $Vh2_1$, $Vh2_2$, . . . $Vh2_{N-1}$. Also, the information acquirer 44 uses the average values of lightness Vh1 and Vh2 to calculate the latest movement average lightness aveN1 and aveN2 of the lamps 16 and 17 of the signal light 11 in the ten frames (excluding the latest Frame N) which is a predetermined time period t, and after doing so, transmits the latest movement average lightness aveN1 and aveN2 to the corrector (step S305).

Also, for each specified range of the lamps 16 and 17, the information acquirer 44 calculates the lightness average values newN1 and newN2 of the pixels of the most-recently captured from Frame N and transmits the calculated lightness average values newN1 and newN2 to the corrector 45 (step S306).

For the specified range of lamp 16, the corrector 45 uses Equation (2) below to calculate the rate1 of the change in lightness.

$$\text{rate1} = \text{newN1} \div \text{aveN1} \times 100 \text{ (percent)} \quad (2)$$

Also, for the specified range of the lamp 17 that is adjacent to lamp 16, the corrector 45 uses Equation (2), substituting newN1 with newN2 and substituting aveN1 with aveN2, to calculate rate2 (step S307).

In the present embodiment, in a case where (i) the rate2 is greater than or equal to 125 (in a case where the adjacent lamp 17 lights up), (ii) the rate2 is less than 80 (the lamp 17 becomes unlit), or (iii) if, where after a determination is made by the determiner 46 that the lamp 17 lit up in a frame before Frame N, the rate2 is not less than 80 (the lit state of the lamp 17 continues) (YES in step S308), then the corrector 45 corrects the rate1 using the Equation (3) below, calculates the rate_LT of the change in lightness of the lamp 16, and transmits the calculated rate_LT to the determiner 46 (step S309). Since it is likely that the change in lightness of the lamp 16 will have an effect on the lightness of the lamp 17 when any of the three cases in step S308 is satisfied, the rate of the change in the lightness of the lamp 16 is corrected by using Equation (3) below in order to reduce the effect.

$$\text{rate\_LT} = \text{rate1} \div \text{rate2} \times 100 \text{ (percent)} \quad (3)$$

If, where after a determination is made by the determiner 46 that the lamp 17 became unlit in a frame before Frame N, the rate2 becomes greater than or equal to 80 or less 125 (NO in step S308 when the unlit state of the lamp 17 continues), then the corrector 45 regards the rate_LT as equal to the value of the rate1 calculated using Equation (2) (step S315) and transmits the rate_LT to the determiner 46. From here, processing advances to step S310.

In step S310, if the rate_LT is greater than or equal to 125 (YES in step S310), then the determiner 46 determines that the lamp 16 lit up and then transits the determination result to the controller 40 (step S311). Processing ends upon completion of this.

If the rate_LT is less than 125 (NO in step S310), then processing proceeds to step S312. If the rate_LT is less than 80 (YES in step S312), then the determiner 46 determines that the lamp 16 became unlit (step S313), and transmits the determination result to the controller 40. Processing ends upon completion of this.

If the rate_LT is greater than or equal to 80 (NO in step S312), then the determiner 46 determines that no change has occurred in the display state of the lamp 16 (step S314), and transmits the determination result to the controller 40. Processing ends upon completion of this.

Although the aforementioned description is directed to a case where a determination is made regarding the lamp 16, in case where a determination is made regarding the lamp 17, the effects of changes in the lightness of the lamps 16 and 18 are taken into account. In a case where a determination is made regarding the lamp 18, the effect of a change in the lightness of the lamp 17 is taken into account similarly to as described above.

Also, although the aforementioned description is directed to a case where the lamps 16 and 17 neither light up nor become unlit in the ten frames which represent the predetermined time period t, in a case where one or both of the lamps 16 and 17 light up or become unlit in the ten frames, the display state of the lamp 16 may be determined in Frame 11 or beyond if there is a significant change in the lightness.

As described above, since the signal light display determination device 20 determines a rate of change in the lightness of the lamp 16 of the signal light 11 based on the rate of change in the lightness (lighting up, becoming unlit, or the like) of the adjacent lamp 17, the signal light display determination device 20 is able to reduce the effect of the change in lightness of the adjacent lamp 17 (effect of light leakage from a joint or a reflection plate due to the lighting up of the lamp 17 or the effect of the lamp 17 becoming unlit, for example). Accordingly, the signal light display determination device 20 is able to accurately determine the display state of the lamp 16 of the signal light 11. The determination accuracy improves particularly in a case where the lamps are adjacent to each other or are in close proximity to one another as is the case for a stacked-type signal light and the like. Also, since the rate of change in the lightness of the lamps 16 and 17 are calculated based on the movement average in a predetermined time period corresponding to the most recent frame, the signal light display determination device 20 can determine the display state of the lamp 16 of the signal light 11 in response to, for example, changes in the gradually-changing sunshine.

Modified Example

Figure 9:
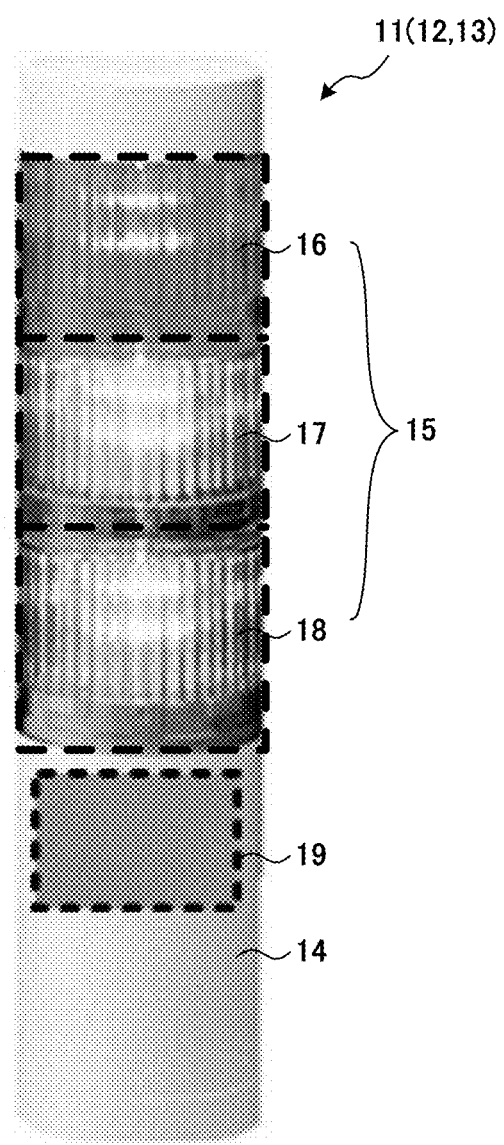
FIG. 9 is a diagram illustrating an overview of a signal light according to a modified example of the present disclosure.

Although the effects of adjacent lamps are taken into account in the aforementioned embodiment, the determination accuracy of the display state of the signal lights can be further enhanced by taking into account ambient light such as changes in sunlight coming through a window or lighting in the factory. Specifically, as illustrated by the dashed lines in FIG. 9, a reference region (non-lit portion) 19 of the base 14 directly below the lamp 18 is set as a region. Since no light is emitted from the reference region 19 and no light passes through here from the interior, any changes in lightness of this reference region 19 accurately indicates changes in the ambient light. The quotient of the Equation (3) is divided by the rateR of change in this reference region 19 and multiplied by 100. In doing so, the effect of the change in the lightness of the lamp due to a change in the ambient light can be reduced, and thus the determination accuracy of the display state of the lamp can be improved. Also, the lightness of the reference region 19 may be used instead of the adjacent lamp 17. The reference region 19 does not have to be adjacent to the lamps 16, 17, and 18. It is sufficient if the reference region 19 is close proximity to the lamps 16, 17, and 18 such that the effect of ambient light on the reference region 19 and the lamps 16, 17, and 18 is substantially the same.

In the aforementioned embodiment, although the determiner 46 determines the display state of the signal light based on a change in lightness, the display state of the signal light may be determined based on a change in hue or the display state of the signal light may be determined based a change in both the lightness and the hue. In a case where the change in the hue is taken into account, the determiner 46 can determine the display state of signal light that is equipped with a single lamp capable of display multiple colors. For example, the hue of the reference region 19 in the previous paragraph may be set to 18 percent gray and the hue of each lamp may be corrected taking into the effect of the ambient light based on the hue of this reference region 19. In doing so, the display state of the lamp of the signal light can be accurate determined based on the hue thereof. In a case where the display state of the signal light is to be determined based on the hue, it is sufficient to set the region on a per-signal light basis rather than a per-lamp basis as in the aforementioned embodiment.

Also, although the effect of an adjacent lamp is taken into account in the aforementioned embodiment, in the case where for example the display state of the lamp 16 is to be determined, the effect of the lamp 18 as well as the adjacent lamp 17 may be taken into account. In such a case, since the lightness of the lamp 17 has a greater effect than that of the lamp 18 on the lightness of the lamp 16, it is preferably to adjust Equation (3) such that the effect of the lightness of the lamp 18 is reduced.

Although the display state of the signal light is determined based on the change in lightness in the aforementioned embodiment, the display state of the signal light may be determined based on a change in a pattern or the display pattern of the signal light may be determined based on a change in one or two or more of the lightness, the hue, and the pattern. Mage recognition is one example of a preferable technique for determining a change in a pattern. Examples of patterns that can be used include arrows, striped patterns, checkered patterns, shapes of components, symbols such as O indicating good and x indicating bad, and written characters. Other elements acquirable from information relating to an image such as luminance, saturation, and/or the like may be utilized.

Also, although the rate1 of a change in lightness is corrected in the aforementioned embodiment, the effect of adjacent lamps and the like can be reduced without correcting the rate of change in lightness by instead, for example, creating and utilizing an association table or the like in which (i) the lightness difference between the lamp 16 and the adjacent lamp 17 and (ii) thresholds are in association with each other for determining whether lamps are lit or unlit.

Figure 8:
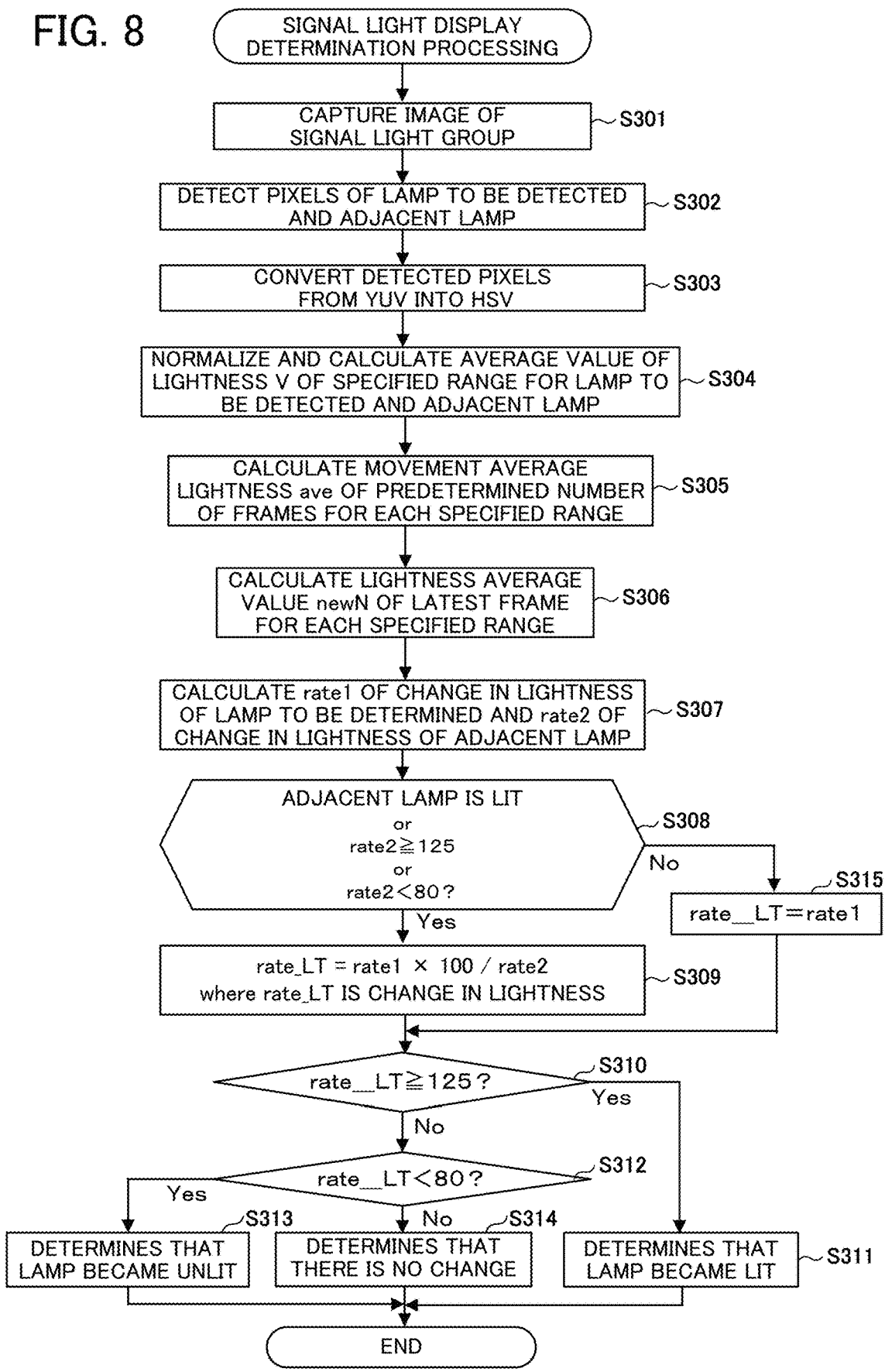
FIG. 8 is a flowchart of signal light display determination processing of the signal light display determination device according to the embodiment of the present disclosure.

Although the rate1 is corrected in the aforementioned embodiment after considering the effect of the adjacent lamp 17 using multiple if-then cases in step S308 of FIG. 8, the rate2 may be reflected into rate1 without using the if-then cases in step S308.

Although the effect of the lamp 17 that is adjacent to the lamp 16 of the same signal light 11 is taken into account in the aforementioned embodiment, the effect of lamps 16, 17, and 18 of the other signal lights 12 and 13 may be taken into account. The accuracy in determining the display state of the signal light 11 can be improved in a case where the other signal lights 12 and 13 are in close proximity to signal light 11.

Although the display state of a signal light equipped with three lamps is determined in the aforementioned embodiment, the display state of a signal light equipped with two lamps or a signal light equipped with four or more lamps may be determined. Also, the color of lamps and the combination of colors of the lamps may be different from those in the aforementioned embodiment.

Although a YUV color space to HSV color space conversion is performed in the aforementioned embodiment, the color space before conversion and the color space after conversion may be replaced with different colors spaces. Examples of other conversions include the conversion from a YPbPr color space expressed by the combination of the luminance signal (Y) and the color differences (Pb and Pr which are a luminance signal and a blue color component difference and the luminance signal and the red color component difference respectively) into a hue-saturation-lumination (HSL) color space.

Although a movement average lightness of ten frames is used in the aforementioned embodiment, a movement average lightness of a number of frames other than ten frames may be used or a lightness of a single frame may be used.

Although lightness is normalized in the aforementioned embodiment, performing normalization is not necessary.

Although the determiner 46 makes a determination the display state has changed to a lit state when the rate_LT is greater than or equal to 125 or makes a determination that the display state has changed to the unlit state when the rate_LT is less than 80 in the aforementioned embodiment, the values that the determiner 46 uses for determining that the display state has changed to a lit state or has changed to an unlit state may be different from 125 and 80.

Although the region corresponding to the entirety of the lamps 16, 17, and 18 is set in the aforementioned embodiment, a region that is merely near to the LEDs of lamps 16, 17, and 18 may be set for example. As another alternative, the right-half portion or the left-half portion of the lamps 16, 17, and 18 may be set as the region. Also, as illustrated in FIG. 1, the lamps 16, 17, and 18 may be spaced apart from one another and it is sufficient as long as they are placed in positions in close proximity to one another such that the display states of the regions mutually affect one another. Instead of a vertical configuration, the lamps 16, 17, and 18 may be arranged in a horizontal configuration or a diagonal configuration.

Although the signal light display determination device 20 and the production facility management system 100 are used in the aforementioned embodiment, the signal light display determination device 20 can be used for used as, for example, a system for managing a logistics facility and can be used for managing various facilities including a production facility and warehouse.

Although the display status of the signal light is displayed on the display 60 of the signal light display determination device 20, the signal light display determination device 20 may be equipped with a communicator and may display the display status of the signal light on an external device such as a monitor via the communicator.

Although the image-capturer 30 of the signal light display determination device 20 is equipped with an image-capturing device 31, alternatively, the signal light display determination device 20 equipped with the communicator yet without any image-capturing device may acquire an image by capturing the display status of the signal light from, for example, an external device such as a camera, via the communicator. Also, the image-capturer 30 may be equipped with multiple image-capturing devices. In doings so, the image-capturer 30 can capture even more signal lights through use of the multiple image-capturing devices.

Although the setter 41 performed the setting of position information of the display 15 in the aforementioned embodiment, the user may instead perform the setting of the position information of the display 15 of the signal lights 11, 12, and 13. The setting of the position information may be performed by having the user use a PC or a tablet to specify the positions of the display 15 and the reference region 19 of the signal lights 11, 12, and 13 while referring to the still images that were acquired when the image-capturing device 31 was installed The individual functions of the signal light display determination device 20 of the present disclosure can also be executed by a computer such as an ordinary personal computer (PC). Specifically, the aforementioned embodiment, the program for the signal light display determination processing that is performed by the signal light display determination device 50 is described as being stored in advance in the ROM of the storage 20. However, the program may be stored in, and distributed through, a non-transitory computer-readable recording medium such as a flexible disk, a compact disc read-only memory (CD-ROM), a digital versatile disc (DVD), a magneto-optical disc (MO), a memory stick, or a universal serial bus (USB), and may be installed onto a computer to enable the computer to achieve the above-described individual functions.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A signal light display determination device comprising:
a memory to store a program; and
a processor to execute the program,
wherein
the processor that executes the program to
acquire, for each of a plurality of frames, lightness of a first region and a second region that is in close proximity to the first region, the first region and the second region being within a region in the plurality of frames and containing at least a portion of a display of a signal light that is image-captured consecutively by a camera,
correct, based on the acquired lightness of the second region, rate of change in the acquired lightness of the first region in a case in which a determination based on rate of change in the acquired lightness of the second region is made that a display state of the display included in the second region has changed from a lit state to an unlit state, from the unlit state to the lit state, or maintains the lit state continuously in a predetermined number of frames, and
determine, based on the corrected rate of the change in the lightness of the first region, a display state of the display included in the first region.

2. The signal light display determination device according to claim 1, wherein the processor acquires lightness of a region of a first lamp portion and a region of a second lamp portion of the signal light image-captured by the camera as the first region and the second region.

3. The signal light display determination device according to claim 1, wherein the processor acquires lightness of a lit lamp region and a non-lit lamp region of the signal light image-captured by the camera as the first region and the second region.

4. The signal light display determination device according to claim 1, wherein the processor acquires lightness of the first region and the second region each time the signal light is image-captured the camera.

5. A signal light display determination method comprising:
acquiring, for each of a plurality of frames by a processor of a computer, lightness of a first region and a second region that is in close proximity to the first region, the first region and the second region being within a region in the plurality of frames and containing at least a portion of a display of a signal light that is image-captured consecutively by a camera;
correcting, based on the acquired lightness of the second region by the processor of the computer, rate of change the acquired lightness of the first region in a case in which a determination based on rate of change in the acquired lightness of the second region is made that a display state of the display included in the second region has changed from a lit state to an unlit state, from the unlit state to the lit state, or maintains the lit state continuously in a predetermined number of frames; and determining, based on the corrected rate of the change in the lightness of the first region by the processor of the computer, a display state of the display included in the first region.

6. A non-transitory computer-readable recording medium having recording therein a program that causes a processor of a computer to:

Acquire, for each of a plurality of frames, lightness of a first region and a second region that is in close proximity to the first region, the first region and the second region being within a region in the plurality of frames and containing at least a portion of a display of a signal light that is image-captured consecutively by a camera, correct, based on the acquired lightness of the second region, rate of change in the acquired lightness of the first region in a case in which a determination based on rate of change in the acquired lightness of the second region is made that a display state of the display included in the second region has changed from a lit state to an unlit state, from the unlit state to the lit state, or maintains the lit state continuously in a predetermined number of frames, and determine, based on the corrected rate of the change in the lightness of the first region, a display state of the display included in the first region.

7. The signal light display determination device according to claim 1, wherein the second region is adjacent to both ends of the first region.

8. The signal light display determination device according to claim 1,
wherein
the processor
calculates average values of the lightness of the first region and the second region for each frame,
calculates movement average lightness of the first region and the second region in the predetermined number of frames using the calculated average values of lightness,
calculates rate of change in the lightness of the first region based on the calculated movement average lightness of the first region and the average value of the lightness of the first region in the latest frame among the plurality of flames, and
calculates rate of change in the lightness of the second region based on the calculated movement average lightness of the second region and average value of the lightness of the second region in the latest frame among the plurality of frames.

9. The signal light display determination method according to claim 5, wherein, in the acquiring of the lightness, the processor acquires lightness of a region of a first lamp portion and a region of a second lamp portion of the signal light image-captured by the camera as the first region and the second region.

10. The signal light display determination method according to claim 5, wherein, in the acquiring of the lightness, the processor acquires lightness of a lit lamp region and a non-lit lamp region of the signal light image-captured by the camera as the first region and the second region.

11. The signal light display determination method according to claim 5, wherein, in the acquiring of the lightness, the processor acquires lightness of the first region and the second region each time the signal light is image-captured the camera.

12. The signal light display determination method according to claim 5, wherein the second region is adjacent to both ends of the first region.

13. The signal light display determination method according to claim 5,
wherein,
the correcting includes
calculating, by the processor of the computer, average values of the lightness of the first region and the second region for each frame,
calculating, by the processor of the computer, movement average lightness of the first region and the second region in the predetermined number of frames using the calculated average values of lightness,
calculating, by the processor of the computer, rate of change in the lightness of the first region based on the calculated movement average lightness of the first region and the average value of the lightness of the first region in the latest frame among the plurality of flames, and
calculating, by the processor of the computer, rate of change in the lightness of the second region based on the calculated movement average lightness of the second region and average value of the lightness of the second region in the latest frame among the plurality of frames.

14. The non-transitory computer-readable recording medium according to claim 6 further having recorded therein a program that causes the processor of the computer to acquire lightness of a region of a first lamp portion and a region of a second lamp portion of the signal light image-captured by the camera as the first region and the second region.

15. The non-transitory computer-readable recording medium according to claim 6 further having recorded therein a program that causes the processor of the computer to acquire lightness of a lit lamp region and a non-lit lamp region of the signal light image-captured by the camera as the first region and the second region.

16. The non-transitory computer-readable recording medium according to claim 6 further having recorded therein a program that causes the processor of the computer to acquire lightness of the first region and the second region each time the signal light is image-captured the camera.

17. The non-transitory computer-readable recording medium according to claim 6, wherein the second region is adjacent to both ends of the first region.

18. The non-transitory computer-readable recording medium according to claim 6 further having recorded therein a program that causes the processor of the computer to:
calculate average values of the lightness of the first region and the second region for each frame,
calculate movement average lightness of the first region and the second region in the predetermined number of frames using the calculated average values of lightness,
calculate rate of change in the lightness of the first region based on the calculated movement average lightness of the first region and the average value of the lightness of the first region in the latest frame among the plurality of flames, and calculate rate of change in the lightness of the second region based on the calculated movement average lightness of the second region and average value of the lightness of the second region in the latest frame among the plurality of frames.

\* \* \* \* \*